United States Patent [19]

Iizuka et al.

[11] 3,762,997
[45] Oct. 2, 1973

[54] PROCESS FOR RECOVERING PROTEIN-CONTAINING MICROBIAL CELLS

[75] Inventors: Hiroshi Iizuka; Naosuke Seto, both of Tokyo; Sadao Sakayanagi, Kawasaki, all of Japan

[73] Assignee: Nippon Oil Company, Ltd., Tokyo, Japan

[22] Filed: Mar. 16, 1970

[21] Appl. No.: 20,829

[30] Foreign Application Priority Data
Sept. 16, 1969 Japan .............................. 44/72993

[52] U.S. Cl. ............................................. 195/28 R
[51] Int. Cl. ............................................ C12d 13/06
[58] Field of Search ....................................... 195/28

[56] References Cited
UNITED STATES PATENTS

| 3,622,465 | 11/1971 | Orgel et al. ...................... 195/28 R |
| 3,384,491 | 5/1968 | Guenter et al. .................... 195/28 X |
| 3,414,477 | 12/1968 | Douros et al. ........................ 195/28 |

Primary Examiner—Joseph M. Golian
Attorney—Sherman and Shalloway

[57] ABSTRACT

A process for recovering protein-containing cells which comprises culturing a microorganism selected from the group consisting of new species *Corynebacterium fujiokense, Nocardia neoopaca, Arthrobacter rubellus* and *Arthrobacter pectroleophagus* under aerobic conditions in a culture medium containing a gaseous $C_2$-$C_4$ hydrocarbon as a carbon source, and separating and recovering cells from the culture broth.

8 Claims, No Drawings

PROCESS FOR RECOVERING PROTEIN-CONTAINING MICROBIAL CELLS

This invention relates to a process for recovering protein-containing microbial cells by culturing a new microorganism in a culture medium containing a gaseous hydrocarbon as its sole carbon source and recovering protein-containing cells from the culture broth. The process of the invention has many advantages over a process using liquid hydrocarbons as a carbon source and gives protein-containing cells havin an abundance of protein and vitamines at good yields.

More particularly, the present invention relates to a process for recovering protein-containing cells which comprises culturing a microorganism selected from the group consisting of Corynebacterium fujiokense, Nocardia neoopaca, Arthrobacter rubellus and Arthrobacter petroleophagus under aerobic conditions in a culture medium containing a gaseous $C_2$–$C_4$ hydrocarbon as a carbon source, and separating and recovering cells from the culture broth.

In recent years, the fermentation industry has developed methods of fermentation wherein inexpensive and readily available hydrocarbons, such as natural gas, by-product gases occurring in the cracking of petroleum naphtha and petroleum paraffins, are utilized as a carbon souce in place of the conventionally used carbohydrates, and various microorganisms which assimilate such carbon sources have been discovered and reported.

Microorganism cells which assimilate there hydrocarbons have attracted much attention because they are nutrient as protein sources for foodstuff and feeds for poultry, domestic animals, and fish, and can be produced on a commercial scale in great quantities for short periods of time to provide inexpensive protein sources.

Heretofore, the research and development work in this field has been concentrated mainly on fermentations involving the use of liquid hydrocarbons such as n-paraffins as carbon sources, and there have been fewer reports made on fermentations involving gaseous hydrocarbons as carbon sources.

The process involving the use of gaseous hydrocarbons as carbon source has a number of commercial advantages over the process using liquid hydrocarbons. Among these are:

a. Purification of cells is easier than the process involving liquid hydrocarbons which requires a complicated and disadvantageous procedure in separating the cells completely from the remaining hydrocarbons so as to remove an odor of petroleum.

b. There is no unsuitability of the obtained cell cake as foodstuff or feed which is ascribable to the remaining of a tar content containing undesirable impurities such as benzpyrene in the case of using liquid hydrocarbons.

c. Liquefied petroleum gas consisting mainly of propane and butane, or fuel gases discharged from the petroleum refining apparatus, which have heretofore found applications mainly as fuels, are available at low costs.

We have screened many microorganisms isolated from cores soils and oil brines in oil and natural gas fields, cores of stratigraphic drilling wells and swampy muds, and as a result, found those microorganisms which are able to assimilate $C_2$–$C_4$ gaseous hydrocarbons and produce cells having a high protein content and an abundance of vitamines in good yields.

Accordingly, an object of the present invention is to provide a process for recovering protein-containing cells having a high protein content and an abundance of vitamines at good yields on a commercial scale using gaseous hydrocarbons as carbon source.

Many other objects and advantages of the present invention will become apparent from the following description.

The new species Corynebacterium fujiokense most preferably used in the process of the invention has bacteriological properties shown in Table 1.

TABLE 1

DESCRIPTION OF THE STRAIN

| | |
|---|---|
| Scientific name of organism | Corynebacterium fujiokense (No.2–51) |
| Morphology | Rods, straight or curved, club-shaped 0.5 to 0.7 by 1.6 to 4.0 microns. In old cultures generally V-formed shorter rods or cocci. |
| Motility | negative |
| Gram Reaction | positive |
| Acid-fastness | negative |
| Yeast extract-Malt extract agar colinies | circular, capitate, smooth, entire, amorphous, light orange, opaque, glistening |
| Nutrient agar slant | abundant growth, filiform, flat, glistening, smooth, pale reddish orange |
| Growth PH | 6–10 |
| Growth Temperature (°C.) | 20–42 |
| Optimum Growth Temperature (°C.) | 25–37 |
| Oxygen | aerobe |
| Gelatin Liquefaction | negative |
| Milk Reaction | alkaline, slowly digested |
| Starch Hydrolysis | negative |
| Nitrate Reduction | negative |
| Catalase Production | positive |
| Cellulose Reaction | none attacked |
| n-Paraffine Utilization | utilize ($C_2$–$C_5$, $C_{11}$–$C_{17}$) |
| Autotrophic Growth | no growth |
| Carbon Utilization | Glucose, gluconate, citrate and succinate are utilized as sole carbon sources. |
| Carbonhdrate Fermentation | Neither acid nor gas are produced from glycerol, xylose, sucrose, lactose, glucose and starch. |
| GC content of DNA (%) | 69.5 |

The above given properties were compared with those of known bacteria in accordance with Bergey's, "Manual of Determinative Bacteriology," 7th edition, and it was found that the present strain belongs to Corynebacterium but differs from any of the known species in respect of morphology, color and capability of forming acid from saccharose. Hence, it was identified as a new species of the genus Corynebacterium, and named Corynebacterium fujiokense. Strain No. 2–51 was deposited in Fermentation Research Institute, Agency of Industrial Science and Technology, Japan under the deposit number FERM-P No. 383, and also deposited in American Type Culture Collection, 12301 Parklawn Drive, Rockville, Md. 20852, U.S.A., under deposit number ATCC 21496.

The new species Nocardia neoopaca used in the present invention has bacteriological properties described in Table 2.

TABLE 2

DESCRIPTION OF THE STRAIN

| | |
|---|---|
| Scientific name of organism | Nocardia neoopaca (No2–53) |
| Morphology | Long branching filaments or rods, straight or curved, 0.6 to 0.8 by 2.0 to 14.0 microns. In old |

| | |
|---|---|
| Motility | negative |
| Gram Reaction | positive |
| Acid-fastness | negative |
| Yeast extract-Malt extract agar colonies | circular, capitate, smooth, entire or filamentous, amorphous, pale pink, opaque, dull |
| Nutrient agar slant | abundant growth, filiform, raised, glistening, smooth, pale pink |
| Growth PH | 5-10 |
| Growth Temperature (°C.) | 20-42 |
| Optimum Growth Temperature (°C.) | 25-30 |
| Oxygen | aerobe |
| Gelatin Liquefaction | negative |
| Milk Reaction | slightly alkaline, litmus reduced, milk unchanged |
| Starch Hydrolysis | negative |
| Nitrate Reduction | positive |
| Catalase Production | positive |
| Cellulose Reaction | none attacked |
| n-Paraffine Utilization | utilize ($C_2$-$C_4$, $C_{11}$-$C_{18}$) |
| Autotrophic Growth | no growth |
| Carbon Utilization | Glucose, gluconate, citrate and succinate are utilized as sole carbon sources. |
| Carbohydrate Fermentation | Neither acid nor gas are produced from glycerol, xylose, sucrose, lactose, glucose and starch. |
| GC content of DNA (%) | 40.0 |

These properties shown in Table 2 were compared with those of known species in accordance with the classification standards described in Bergey's, "Manual of Determinative Bacteriology," 7th edition, and it was found that this strain is similar to *Nocardia opaca* in respect of morphological properties, color of the slant culture and physiological properties, but differs from the reference strain in that acid-fastness is not observed in any stage of culturing, no aerial hypha is observed, and that the GC base composition of DNA is different. Hence, this strain has been identified as a new species of the genus Nocardia, and named *Nocardia Neoopaca*. Strain No. 2-53 was deposited in the above-mentioned institution of the Japanese government under the deposit number FERM-P No. 378, and also deposited in American Type Culture Collection, 12301 Parklawn Drive, Rockville, Md. 20852, U.S.A., under deposit number ATCC 21499.

The new species *Arthrobacter rubellus* used in the present invention has the bacteriological properties shown in Table 3 below. This new species and the new species shown in Table 4 both belong to the genus Arthrobacter, and come next to the species shown in Table 1 in the order of suitability for use in the present invention.

TABLE 3

DESCRIPTION OF THE STRAIN

| | |
|---|---|
| Scientific name of organism | *Arthrobacter rubellus* (No2-04) |
| Morphology | Rods, straight or curved, clusshaped, 0.4 to 0.6 by 1.0 to 1.4 microns. In old cultures V-formed shorter rods cocci. Metachromatic granule and cystite are sometimes seen. |
| Motility | negative |
| Gram Reaction | positive or negative (positive in old cells) |
| Acid-fastness | negative |
| Yeast extract-Malt extract agar colonies | circular, pulvinate, rugose, entire, amorphous, reddish orange, opaque, dull |
| Nutrient agar slant | abundant growth, filiform, raised, dull, rugose, light reddish orange |
| Growth PH | 5.5-10.0 |
| Growth Temperature (°C.) | 20-42 |
| Optimum Growth Temperature (°C.) | 25-37 |
| Oxygen | aerobe |
| Gelatin Liquefaction | negative |
| Milk Reaction | alkaline, slowly digasted |
| Starch Hydrolysis | negative |
| Mitrate Reduction | negative |
| Catalase Production | positive |
| Cellulose Reaction | none attacked |
| n-Paraffine Utilization | utilize ($C_2$-$C_5$) |
| Autotrophic Growth | no growth |
| Carbon Utilization | Glucose, glucomate citrate and glycerol are utilized as sole carbon sources. |
| Carbohydrate Fermentation | Neither acid nor gas are produced from glycerol, xylose, sucrose, lactose, glucose and starch. |
| GC content of DNA (%) | 69.5 |

The properties shown in Table 3 were compared with those of known species in accordance with the classification standards described in Bergey's, "Manual of Determinative Bacteriology," 7th edition, and it was found that this species belongs to the genus Arthlobacter, but differs from the known species in respect of color and physiological properties. Strain No. 2-04 was deposited in the above-mentioned institution of the Japanese government under deposit number FERM-P No. 382, and also deposited in American Type Culture Collection, 12301 Parklawn Drive, Rockville, Maryland 20852, U.S.A., under deposit number ATCC 21495.

The new species *Arthrobacter petroleophagus* used in the present invention have the bacteriological properties shown in Table 4 below.

TABLE 4

DESCRIPTION OF THE STRAIN

| | |
|---|---|
| Scientific name of organism | Arthrobacter petroleophagus (No2-15) |
| Morphology | Rods, straight or curved, club-shaped, 0.4 to 0.6 by 1.4 to 1.6 microns. In old cultures V-formed shorter rods or cocci. |
| Motility | negative |
| Gram Reaction | positive or negative (positive in old cells) |
| Acid-fastness | negative |
| Yeast extract-Malt extract agar colonies | circular, capitate, smooth, entire, amorphous, pale orange, opaque, glistening |
| Nutrient agar slant | abundant growth, filiform, pulvinate, glistening, smooth, pale yellow orange |
| Growth PH | 5.5-10.0 |
| Growth Temperature (°C.) | 20-42 |
| Optimum Growth Temperature (°C.) | 25-37 |
| Oxygen | aerobe |
| Gelatin Liquefaction | negative |
| Milk Reaction | alkaline, slowly digasted |
| Starch Hydrolysis | negative |
| Nitrate Reduction | negative |
| Catalase Production | positive |
| Cellulose Reaction | none attacked |
| n-Paraffine Utilization | utilize ($C_2$-$C_5$, $C_{11}$-$C_{18}$) |
| Autotrophic Growth | no growth |
| Carbon Utilization | Glucose, citrate and glycerol are utilized as sole carbon sources. |
| Carbohydrate Fermentation | Neither acid nor gas are produced from glycerol, xylose, sucrose, lactose, glucose and starch. |
| GC content of DNA (%) | 64.2 |

Strain No. 2-15 was deposited in the above-mentioned Japanese government institution under deposit number FERM-P No. 381, and also in American Type Culture Collection, 12301 Parklawn Drive, Rockville, Md. 20852, U.S.A., under deposit number ATCC 21494.

All of the four species of microorganisms employed in the process of the present invention are new ones.

Various microorganisms which belong to the genus Corynebacterium have been known to assimilate liquid hydrocabons, but no report has yet been made heretofore about the species which assimilate gaseous hydrocarbons. As to the microorganisms which belong to the genus Nocardia and assimilate gaseous hydrocarbons, J. B. Davis, H. H. Chase and R. L. Raymond, "Appl. Mikrobiol.," 4 (6), 310–315 (1956) describes the presence of species which assimilate ethane ($C_2$), but the writers are quite silent on the names of such species nor its bacteriological characteristics.

As to the microorganism which belongs to the genus Arthrobacter and assimilates gaseous hydrocarbons, British Pat. No. 1,166,964 published after the priority date of the present application discloses the presence of *Arthrobacter roseoparaffinus*.

The new species shown in Tables 1 to 4 all assimilate $C_2$–$C_4$ gaseous hydrocarbons, and therefore, a culture medium containing a gaseous $C_2$–$C_4$ hydrocarbon as a carbon source is employed. The culture medium usually contains a nitrogen source source additionally, and preferably minerals.

The term "culture medium containing a $C_2$–$C_4$ gaseous hydrocarbon as a carbon source" refers not only to a carbon source consisting of one or more of $C_2$–$C_4$ hydrocarbons such as ethane, propane and n-butane, but also to a carbon source consisting of at least 50 percent by weight of one or more of such hydrocarbons and a minor amount of other hydrocarbons such as olefins and isoparaffins. Hence, $C_4$ fraction remaining after recovering ethylene and butadiene from a cracked product of naphtha, or a gaseous mixture of liquefied petroleum gas consisting predominantly of propane and butane can also be used in the present invention.

Usually, the culture medium used in the present invention contains a nitrogen source besides the carbon source hereinbefore described. As such nitrogen source, we can mention organic nitrogen sources such as urea, pepton, meat-extract, yeast-extract, malt-extract, and amino acids and inorganic nitrogen sources such as ammonium chloride, ammonium nitrate, sodium nitrate, potassium nitrate, ammonium sulfate, ammonium hydrogenphosphate, ammonium dihydrogenphosphate and sodium nitrite.

It is preferred that the culture medium used in the present invention further contains minerals, examples of which are dipotassium phosphate potassium phosphate, disodium phosphate, sodium phosphate, magnesium sulfate, calcium chloride, ferric chloride, ferrous sulfate and ferric sulfate. Preferably, the culture medium further contains a critical amount of an inorganic salt such as molybdenum oxide, zinc sulfate, copper sulfate, boric acid, manganese sulfate and cobalt chloride. It is sufficient that the amounts of minerals are about $5 \times 10^{-7}$ to $5 \times 10^{-2}$ percent based on the weight of the medium.

There is no particular limitation on the amount of the gaseous carbon source used in the present invention. But usually the amount recommended ranges 50 – 500 percent by volume (at 30°C.), preferably 100 – 200 percent by volume, based on the total volume of the culture medium. In a continuous method, either fewer or more amounts can be used as the waste gas can be recycled.

The amounts of the nitrogen source may vary over a considerably wide range, but most commonly 0.02 – 0.5 percent by weight, preferably 0.1 – 0.2 percent by weight can be used on the basis of the total weight of the culture medium.

Some examples of the culture medium suited for use in the present invention excepting a carbon source are as follows:

a. Aqueous medium with a pH adjusted to 7.2 which has been prepared by dissolving in 1 liter of tap water 1 g of $NH_4Cl$, 0.5 g of $K_2HPO_4$, 0.2 g of $MgSO_4 \cdot 7H_2O$, 0.01 g of $CaCl_2 \cdot 2H_2O$, 0.001 g of $FeCl_3 \cdot 6H_2O$, 10 µg of $MoO_3$, 70 µg of $ZnSO_4 \cdot 7H_2O$, 5 µg of $CuSO_4 \cdot 5H_2O$, 10 µg of $H_2BO_3$, 10 µg of $MnSO_4 \cdot 5H_2O$ and 10 µg of $CoCl_3 \cdot 6H_2O$.

b. Aqueous medium with a pH adjusted to 7.2 which has been prepared by dissolving in 1 liter of tap water 1 g of $NH_4Cl$, 0.5 g of $Na_2HPO_4$, 0.2 g of $KH_2PO_4$, 0.2 g of $MgSO_4 \cdot 7H_2O$, 0.01 g of $CaCl_2 \cdot 2H_2O$, 0.001 g of $TeCl_3 \cdot 6H_2O$, 10 µg of $MoO_3$, 70 µg of $ZnSO_4 \cdot 7H_2O$, 5 µg of $CuSO_4 \cdot 5H_2O$, 10 µg of $H_3BO_3$, 10 µg of $MnSO_4 \cdot 5H_2O$ and 10 µg of $CoCl_3 \cdot 6H_2O$.

c. Aqueous medium with a pH adjusted to 7.2 which has been prepared by dissolving into one liter of tap water 2 g of $NaNo_3$, 0.5 g of $Na_2HPO_4$, 0.2 g of $KH_2PO_4$, 0.2 g of $MgSO_4 \cdot 7H_2O$, 0.01 g of $CaCl_2 \cdot 2H_2O$, 0.002 g of $FeSO_4 \cdot 7H_2O$, 10 µg of $MoO_3$, 70 µg of $ZnSO_4 \cdot 7H_2O$, 5 µg of $CuSO_4 \cdot 5H_2O$, 10 µg of $H_3BO_3$, 10 µg of $MnSO_4 \cdot 5H_2O$ and 10 µg of $CoCl_3 \cdot 6H_2O$.

Prior to inoculating microorganisms in a culture medium, sterilization of the culture medium is carried out in accordance with a customary method. Most commonly, heat sterilization can be effected at 120° ± 10°C. for about 15 to 30 minutes. It is a usual practice to inoculate a strain in a heat sterilized culture medium, and introduce a gaseous mixture of a gaseous hydrocarbon and air or oxygen or a gaseous mixture of carbon dioxide, hydrogen and air or oxygen through a sterilizing filter.

In the present invention using a gaseous carbon source, the employment of pressure culturing leads to an increase of solubility of the carbon source in a culture liquor. In addition, depending upon the degree of pressure, the gaseous carbon source is readily liquefied, and in the liquid state, is assimilated by microorganisms. This is effective also in inhibiting the generation of heat in a fermentation process, and an increase in the yield of cells can be expected.

The culturing temperation that can be employed in the invention ranges from about 20°C. to about 40°C., preferably 25° – 35°C., more preferably 30° ± 3°C. The pH of the culture medium that can be used in the invention is about 5 to about 10, preferably 6 to 8. Culturing is effected under aerobic conditions, and known aerobic culturing means such as a batchwise shaking culture method and a continuous stirring culture method can be employed in the presence of a molecular oxygen-containing gas, such as oxygen, air or a mixture thereof.

The culturing time may vary depending upon the strain used, composition of the culture medium, carbon source used, culturing temperature, pH of the culture medium or culturing means, but is usually from 3 to 10 days, preferably from 5 to 7 days.

After the end of culturing, cells are separated and recovered from the culture broth, and if desired, subjected to purification.

Usually, it is sufficient that cells in the culture broth are separated and recovered by centrifugal separation after the end of culturing, followed by washing 2 or 3 times with tap water for instance, and freeze-drying or spray-drying.

The obtained protein-containing cells have a high protein content, and an abundance of vitamins. They can be utilized as excellent protein sources as foodstuff or feeds for domestic animals, poultry and cultivated fish, either directly or after processing.

Several embodiments of the method of the invention will be described below by working examples.

Example 1

$NH_4Cl$ (1 g), $K_2HPO_4$ (0.5 g), $MgSO_4 \cdot 7H_2O$ (0.2 g), $CaCl_2 \cdot 2H_2O$ (0.01 g), $FeCl_3 \cdot 6H_2O$ (0.001 g), $MoO_3$ (10 μg), $ZnSO_4 \cdot 7H_2O$ (70 μg), $CuSO_4 \cdot 5H_2O$ (5 μg), $H_3BO_3$ (10 μg), $MnSO_4 \cdot 5H_2O$ (10 μg) and $CoCl_3 \cdot 6H_2O$ (10 μg) were dissolved in 1 liter of tap water and the pH was adjusted to 7.2. 100 ml of the so formed culture medium was put into a 500 ml gas flask and sterilized at 120°C. for 20 minutes. Then, one platinum-loopful of *Nocardia neoopaca* strain No. 2-53 was inoculated into the culture medium and a mixed gas of ethane and air at a volume ratio of 1:3 was introduced into a glass flask through a sterilizing filter. The culturing was conducted at 28°C. for 7 days under shaking. Cells growing in the culture medium were centrifugally separated and recovered. The collected cells were washed three times with tap water, and freeze-dried. The gas compositions before and after were determined by gas chromatography analysis. As a result, it was confirmed that the yield of cells was 42 percent by weight based on ethane consumed during culturing and the protein content of the dried cells was 48.3 percent by weight.

Example 2

*Nocardia neoopaca* strain No. 2-53 was cultured at 28°C. for 7 days using the same culture medium and procedure as described in Example 1 except that propane was fed as carbon source. The culture broth was washed three times with tap water and dried in a drier. The yield of cells was 38 percent by weight based on propane consumed during culturing, and the protein content of the dried cells was 40.0 percent by weight. The amino acid composition and vitamin content of the cells are shown in Table 5. From this table it is seen that the cells have a high nutritive value.

Example 3

*Corynebacterium fujiokense* strain No. 2-51 was cultured at 30°C. for 7 days by using ethane as carbon source using the same culture medium and procedure as described in Example 1. The resulting culture broth was treated in the same manner as in Example 2. The yield of the cells was 41 percent by weight based on ethane consumed during culturing and the protein content of the dried cells was 52.2 percent by weight.

The amino acid composition and vitamin content of the cells are shown in Table 5.

Example 4

*Corynebacterium fujiokense* strain No. 2-51 was cultured at 30°C. using the same culture medium and culturing conditions as described in Example 1 and employing propane or n-butane as carbon source. In the case of n-butane, the n-butane: air volume ratio was adjusted to 1:4. The culture broth was treated in the same manner as in Example 1. When propane was fed as carbon source, the yield of the resulting cells was 39 percent by weight based on consumed propane and the protein content of the dried cells was 50.1 percent by weight. In the case of n-butane, the yield of the resulting cells was 34 percent by weight based on consumed n-butane and the protein content of the dried cells was 48.7 percent by weight.

Example 5

*Arthrobacter petroleophagus* strain No. 2-15 was cultured at 28°C. for 7 days using the same culture medium and procedure as described in Example 1 and using ethane as carbon source. The culture broth was treated in the same manner as in Example 2. The yield of the cells was 43 percent by weight based on consumed ethane. The protein content of the dried cells was 40.8 percent by weight.

Example 6

By employing propane or n-butane as carbon source, *Arthrobacter rubbelus* strain No. 2-04 was cultured for 7 days under the same conditions as adopted in Example 2 or 4. The culture broth was treated in the same manner as in Example 1. In the case of propane, the yield of the resulting cells was 38 percent by weight based on consumed propane and the protein content of the dried cells was 41.2 percent by weight. In the case of n-butane, the yield of the resulting cells was 31 percent by weight based on consumed n-butane and the protein content of the dried cells was 45.7 percent by weight. The amino acid composition and vitamin content of the cells produced in the case of n-butane are shown in Table 5.

TABLE 5

[Amino Acid Composition and Vitamin Content]

| Example number | 2 | 3 | 6 |
|---|---|---|---|
| Strains | *Nocardia neoopaca*, Strain No. 2-53 | *Corynebacterium fujiokense*, Strain No. 2-51 | *Arthrobacter rubbelus*, Strain No. 2-04 |
| Carbon source | Propane | Ethane | n-Butane |
| Amino acid composition (weight percent based on proteins): | | | |
| Essential amino acids: | | | |
| Leucin | 6.56 | 6.73 | 6.40 |
| Isoleucin | 3.51 | 3.67 | 4.01 |
| Valine | 5.68 | 5.48 | 5.44 |
| Threonine | 4.14 | 5.07 | 4.11 |
| Methionine | 1.29 | 1.46 | 1.76 |
| α-Lysine | 4.11 | 4.05 | 3.86 |
| Phenylalanine | 3.80 | 3.45 | 3.73 |
| Tryptophane | | | |
| Arginine | 5.55 | 5.34 | 5.09 |
| Histidine | 2.27 | 1.63 | 1.39 |
| Cystine | 0.40 | 0.32 | 0.22 |
| Non-essential amino acids: | | | |
| Serine | 3.23 | 3.24 | 3.62 |
| Glutamic acid | 12.96 | 10.38 | 11.02 |
| Proline | 3.29 | 3.74 | 3.19 |
| Glycine | 4.20 | 4.87 | 5.10 |
| Alanine | 8.62 | 8.14 | 8.48 |
| Tyrosine | 2.21 | 2.13 | 2.37 |
| Aspartic acid | 7.60 | 8.13 | 8.29 |
| Vitamin content (mg./kg.): | | | |
| Vitamin $B_1$ | 17 | 23 | 19 |
| Vitamin $B_2$ | 43 | 40 | 52 |
| Vitamin $B_6$ | 153 | 100 | 120 |
| Vitamin $B_{12}$ | 11.0 | 9.6 | 6.8 |
| Nicotinic acid | 200 | 180 | 168 |
| Pantothenic acid | 28 | 31 | 24 |

We claim:
1. A process for recovering protein-containing cells which comprises culturing a microorganism selected from the group consisting of species *Corynebacterium fujiokense* (ATCC 21496), *Nocardia neoopaca* (ATCC 21499), *Arthrobacter rubellus* (ATCC 21495) and *Arthrobacter petroleophagus* (ATCC 21494) under aerobic conditions in a culture medium containing a gaseous $C_2$–$C_4$ hydrocarbon as a carbon source, and separating and recovering cells from the culture broth.

2. The process of claim 1 wherein said culture medium further contains a nitrogen source.

3. The process of claim 2 wherein said culture medium further contains mineral.

4. The process of claim 2 wherein said nitrogen source is selected from the group consisting of urea, ammonium chloride, ammonium sulfate, sodium nitrate, potassium nitrate, ammonium hydrogenphosphate and ammonium dihydrogenphosphate.

5. The process of claim 3 wherein said mineral is selected from the group consisting of dipotassium phosphate, potassium phosphate, disodium phosphate, sodium phosphate, magnesium sulfate, calcium chloride, ferric chloride, ferrous sulfate, ferric sulfate, molybdenum oxide, zinc sulfate, copper sulfate, boric acid, manganese sulfate and cobalt chloride.

6. The process of claim 1 wherein the culturing is carried out at a temperature of about 20°C. to about 40°C. at a pH of about 5 to about 10.

7. The process of claim 6 wherein the culturing temperature is 25° – 35°C., and the pH of the culture medium is 6 to 8.

8. The process of claim 1 wherein said carbon source contains at least 50 percent by weight of a gas selected from the group consisting of ethane, propane, butane and mixtures thereof.

* * * * *